United States Patent
VanBlon et al.

(10) Patent No.: US 10,387,570 B2
(45) Date of Patent: Aug. 20, 2019

(54) ENHANCED E-READER EXPERIENCE

(71) Applicant: LENOVO (Singapore) PTE, LTD., New Tech Park (SG)

(72) Inventors: Russell Speight VanBlon, Raleigh, NC (US); James Anthony Hunt, Chapel Hill, NC (US); Scott Wentao Li, Cary, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 238 days.

(21) Appl. No.: 14/837,855

(22) Filed: Aug. 27, 2015

(65) Prior Publication Data

US 2017/0060365 A1 Mar. 2, 2017

(51) Int. Cl.
- *G06F 3/01* (2006.01)
- *G06F 17/27* (2006.01)
- *G06F 15/02* (2006.01)
- *G06F 1/16* (2006.01)

(52) U.S. Cl.
CPC .......... *G06F 17/2785* (2013.01); *G06F 1/163* (2013.01); *G06F 3/012* (2013.01); *G06F 3/013* (2013.01)

(58) Field of Classification Search
None
See application file for complete search history.

(56) References Cited

U.S. PATENT DOCUMENTS

| | | | | |
|---|---|---|---|---|
| 6,466,213 B2 * | 10/2002 | Bickmore | ............... | G06T 13/40 345/473 |
| 6,873,314 B1 * | 3/2005 | Campbell | ............. | A61B 3/113 345/156 |
| 6,892,352 B1 * | 5/2005 | Myers | ................. | G06F 3/04842 707/E17.121 |
| 7,429,108 B2 * | 9/2008 | Rosenberg | .............. | G06F 3/013 351/209 |
| 8,010,094 B2 * | 8/2011 | Cox | .................. | H04M 1/72519 455/418 |
| 8,799,765 B1 * | 8/2014 | MacInnis | .............. | G06F 17/241 715/230 |
| 9,047,784 B2 * | 6/2015 | Brownlow | ............... | G09B 5/06 |
| 9,165,381 B2 * | 10/2015 | Latta | ....................... | G06T 11/00 |
| 9,472,113 B1 * | 10/2016 | Hwang | ................... | G09B 5/062 |
| 9,606,622 B1 * | 3/2017 | Brothers | .................. | G06F 3/013 |
| 9,697,562 B2 * | 7/2017 | De Assuncao | ..... | G06Q 30/0601 |

(Continued)

FOREIGN PATENT DOCUMENTS

WO WO2006100645 A2 * 9/2006

*Primary Examiner* — Yongjia Pan
(74) *Attorney, Agent, or Firm* — Kunzler Bean & Adamson

(57) ABSTRACT

For supplementing digital text with multimedia effects, systems, apparatus, and methods are disclosed. The apparatus includes a processor and a memory that stores code executable by the processor. The code includes code that determines a current reading position, determines a narrative context based on the current reading position, selects a multimedia effect based on the narrative context, and presents the multimedia effect to a user. In some embodiments, the apparatus includes an image sensor that receives image data and determines the current reading position based on the image data. In other embodiments, the apparatus may determine the current reading position based on biometric position data.

16 Claims, 6 Drawing Sheets

(56) References Cited

U.S. PATENT DOCUMENTS

| | | | | |
|---|---|---|---|---|
| 2003/0018663 A1* | 1/2003 | Cornette | G06F 17/21 | 715/202 |
| 2004/0023200 A1* | 2/2004 | Blume | G06F 3/03545 | 434/317 |
| 2004/0057590 A1* | 3/2004 | Lo | H04S 3/00 | 381/307 |
| 2007/0245375 A1* | 10/2007 | Tian | G10H 1/0041 | 725/45 |
| 2008/0168073 A1* | 7/2008 | Siegel | G06F 17/3002 | |
| 2008/0215984 A1* | 9/2008 | Manico | G06F 17/30035 | 715/730 |
| 2009/0285403 A1* | 11/2009 | Yeh | H04R 3/14 | 381/1 |
| 2010/0050064 A1* | 2/2010 | Liu | G06F 17/2765 | 715/202 |
| 2010/0082345 A1* | 4/2010 | Wang | G06T 13/205 | 704/260 |
| 2011/0025916 A1* | 2/2011 | Kohara | H04S 7/30 | 348/563 |
| 2011/0087955 A1* | 4/2011 | Ho | G06F 17/211 | 715/230 |
| 2011/0205148 A1* | 8/2011 | Corriveau | G06F 3/013 | 345/156 |
| 2012/0001923 A1* | 1/2012 | Weinzimmer | G06F 3/013 | 345/473 |
| 2012/0005617 A1* | 1/2012 | Lee | G06F 17/30038 | 715/776 |
| 2012/0151351 A1* | 6/2012 | Kilroy | G06Q 30/02 | 715/733 |
| 2012/0204092 A1* | 8/2012 | Stoner | G06F 3/0483 | 715/234 |
| 2012/0240085 A1* | 9/2012 | Sim | G09B 5/14 | 715/864 |
| 2012/0310642 A1* | 12/2012 | Cao | G10L 13/00 | 704/235 |
| 2013/0080471 A1* | 3/2013 | Forte | G06F 21/6218 | 707/785 |
| 2013/0111392 A1* | 5/2013 | Muraki | G06F 17/242 | 715/776 |
| 2013/0145240 A1* | 6/2013 | Anderson | G06F 3/0483 | 715/201 |
| 2013/0151955 A1* | 6/2013 | Williams | G06F 17/24 | 715/255 |
| 2013/0168954 A1* | 7/2013 | Koren | G09B 5/062 | 281/15.1 |
| 2013/0209981 A1* | 8/2013 | Newell | G09B 5/062 | 434/317 |
| 2014/0002491 A1* | 1/2014 | Lamb | G06F 1/163 | 345/633 |
| 2014/0038154 A1* | 2/2014 | Brownlow | G09B 5/06 | 434/317 |
| 2014/0040715 A1* | 2/2014 | Younge | G06F 17/24 | 715/203 |
| 2014/0127667 A1* | 5/2014 | Iannacone | G09B 5/02 | 434/379 |
| 2014/0253434 A1* | 9/2014 | Ho | G06F 3/011 | 345/156 |
| 2014/0267021 A1* | 9/2014 | Lee | G06F 3/013 | 345/156 |
| 2014/0362201 A1* | 12/2014 | Nguyen | H04R 3/00 | 348/78 |
| 2014/0365342 A1* | 12/2014 | De Assuncao | G06Q 30/0601 | 705/27.1 |
| 2015/0039991 A1* | 2/2015 | Cameron | G06F 3/04817 | 715/230 |
| 2015/0070150 A1* | 3/2015 | Levesque | G06F 3/016 | 340/407.1 |
| 2015/0082136 A1* | 3/2015 | Cameron | G11B 27/005 | 715/203 |
| 2015/0123966 A1* | 5/2015 | Newman | G06T 19/006 | 345/419 |
| 2015/0269133 A1* | 9/2015 | Do | G06F 17/241 | 348/78 |
| 2016/0139786 A1* | 5/2016 | Kaldma | G06F 3/04847 | 715/716 |
| 2016/0187976 A1* | 6/2016 | Levesque | G06F 3/016 | 705/14.4 |
| 2016/0210269 A1* | 7/2016 | Parker | G06F 17/212 | |

\* cited by examiner

ENHANCED E-READER EXPERIENCE

FIELD

The subject matter disclosed herein relates to digital text and more particularly relates to supplementing digital text with multimedia effects.

BACKGROUND

Description of the Related Art

Electronic readers (e-readers) and digital text are supplementing, and in some instances replacing, traditional print media such as books, periodicals, and the like. Sometimes the readers may display images provided by the author with the digital text. Other forms of media, such as cinema and television, include music and sound to enhance the user's experience. However, multimedia experience of the readers is lacking and in some cases nonexistent.

BRIEF SUMMARY

An apparatus for supplementing digital text with multimedia effects is disclosed. A method and computer program product also perform the functions of the apparatus. The apparatus includes a processor and a memory that stores code executable by the processor. The code includes code that determines a current reading position based on image data, determines a narrative context based on the current reading position, selects a multimedia effect based on the narrative context, and presents the multimedia effect to a user. The apparatus may also include an image sensor that receives image data.

In certain embodiments, the apparatus includes a network interface that communicates with a remote database. Selecting a multimedia effect based on the narrative context may include querying the remote database for a multimedia effect corresponding to the narrative context.

In some embodiments, the apparatus includes code that identifies a device capability. Selecting a multimedia effect based on the narrative context may include further selecting a multimedia effect based on the device capability. In some embodiments, the apparatus includes code that detects external multimedia equipment coupled to the apparatus. Selecting a multimedia effect based on the narrative context may include further selecting the multimedia effect based on the external multimedia equipment coupled to the apparatus.

In certain embodiments, the apparatus includes code that identifies an illustration near the current reading position. Identifying the narrative context of the current reading position may include associating the illustration with at least one keyword. Selecting a multimedia effect based on the narrative context may include selecting a multimedia effect corresponding to the at least one keyword. In one embodiment, the image it includes one or more of head position data and ocular position data.

The method includes receiving, by use of a processor, the biometric position data. The method also includes determining a current reading position based on the biometric position data. The method further includes determining a narrative context from the current reading position. Additionally, the method includes selecting a multimedia effect based on the narrative context.

In some embodiments, the determining the current reading position based on the biometric data includes determining a reading speed based on the biometric position data. Determining the current reading position may also include determining an elapsed time from the user reaching a reference position. Determining the current reading position may further include determining the current reading position based on the reading speed and on the elapsed time.

In some embodiments, the method includes identifying metadata associated with the current reading position. Determining a narrative context of the current reading position may include determining the narrative context based on the metadata. In some embodiments, the method includes identifying a location of the current reading position with respect to a chapter and. Selecting the multimedia effect may further include selecting a multimedia effect based on the location of the current reading position with respect to a chapter end. The method may further include presenting the multimedia effect.

In certain embodiments, presenting the multimedia effect includes monitoring for a trigger event and present the multimedia effect in response to detecting the triggering event. In some embodiments, presenting the multimedia effect includes monitoring for a stop condition and ceasing to present the multimedia effect in response to detecting the stop condition. In certain embodiments, presenting the multimedia effect includes displaying a notification near the current reading position and presenting the multimedia effect in response to a user selecting the notification.

In certain embodiments, determining a narrative context of the current reading position includes performing a natural language analysis on text at the current reading position. In some embodiments, determining a narrative context of the current reading position includes identifying a genre. Selecting the multimedia effect may further include matching the multimedia effect to the identified genre The computer program product includes a computer readable storage medium that stores code executable by a processor, the executable code comprising code to perform: determining a current reading position, determining a narrative context of the current reading position, selecting a multimedia effect based on the narrative context, and presenting the multimedia effect. In some embodiments, the computer program product includes code to perform: identifying a user multimedia preference. Selecting a multimedia effect based on the narrative context may include selecting a multimedia format based on the user multimedia preference.

In certain embodiments, the computer program product includes code to perform: determining a reading speed and determining a presentation time based on the reading speed and on the current reading position. The current reading position may include a current chapter, a page, and/or a paragraph. Presenting the multimedia effect may include presenting the multimedia effect of the presentation time. In some embodiments, presenting the multimedia effect includes presenting the multimedia effect in response to a triggering event. The multimedia effect may include an image, music, a sound effect, an animation, a color scheme, and/or an avatar.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
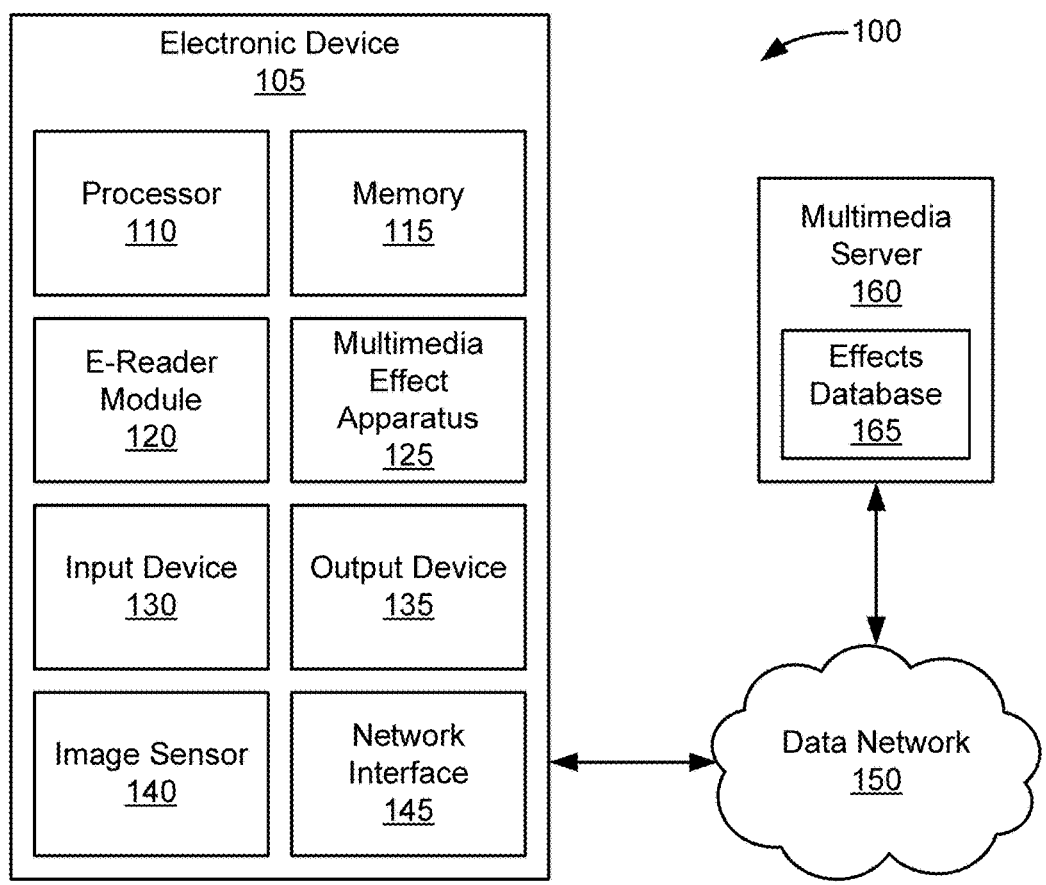
FIG. 1 is a schematic block diagram illustrating one embodiment of a system for supplementing digital text with multimedia effects.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM," a.k.a. Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the depicted systems, methods, apparatuses, and computer program products relates to automatically and dynamically generating a multimedia experience in an e-reader device based on the content of the e-book or digital text. As used herein, an "e-reader device" refers to physical e-reader devices or an e-reader application running on a general purpose device. In some embodiments, a wearable device may be used to identify text on a paper book or separate e-reader device and dynamically generate a multimedia experience.

To generate the multimedia experience, a current reading position is determined. In some embodiments by tracking data and/or head tracking data is used to determine the current word, line, paragraph, or page the user is reading. Time since the current page was loaded (or turned to) may also be used to identify where the user is currently reading. In one embodiment, metadata provided by an author or other users of the work may be used to generate the multimedia experience.

After identifying the current reading position, nearby text is analyzed for key words or phrases indicating a narrative context. These keywords/phrases are then matched to various multimedia effects, which are presented to company the user while reading the text. Multimedia effects may be in various formats, including music, sound effects, background images/animations, color schemes, avatars, brightness levels, background voices, and the like.

The multimedia effects may be categorized and matched according to a genre of the book, such as mystery, science fiction, thriller, fantasy, romance, memoir, young adult, and the like. Specific paragraphs and/or keywords may also trigger matching music, sound effects, or other multimedia effects that enhance the reading experience. The end of the chapter may cause music to decrease in volume until muted. Additionally, approaching the end of the chapter may also signal the start of a song, color scheme, or the like.

In some embodiments, the multimedia effects may be delivered as a notification while reading. The notification may be a link, an icon, a button, or similar. For example, the user may have to select an icon when they reach a certain reading position before the multimedia effect is played. In various embodiments, the multimedia effects may be customized and/or disabled depending on user preferences to the multimedia types/formats for example, users may specify to only play certain types of multimedia effects for certain reading genres.

FIG. 1 depicts a system 100 for supplementing digital text with multimedia effects. The system 100 may include an electronic device 105, itself including one or more of: a processor 110, a memory 115, an e-reader module 120, a multimedia effect apparatus 125, an input device 130, an output device 135, an image sensor 140, and a network interface 145. In some embodiments, the electronic device 105 may be connected to another device, such a multimedia server 160, via a data network 150. The data network 150 may be the Internet, a local area network, a wide-area network, a Wi-Fi network, a mobile telephone network, or combinations thereof.

The electronic device 105 may be any digital device capable of supplementing digital text with multimedia effects, including, but not limited to, an e-reader, a mobile phone, a smart phone, a tablet computer, a laptop computer, a desktop computer, a gaming console, or the like. In other embodiments, the electronic device 105 may include a personal digital assistant, a television, a wearable computer, a vehicle dashboard, or the like.

The processor 110, in one embodiment, may comprise any known controller capable of executing computer-readable instructions and/or capable of performing logical operations. For example, the processor 110 may be a microcontroller, a microprocessor, a central processing unit ("CPU"), a graphics processing unit ("GPU"), an auxiliary processing unit, a field programmable gate array ("FPGA"), or similar programmable controller. In certain embodiments, the processor 110 includes a timer configured to track the passage time. For example, the processor 110 may include a timer circuit that tracks the passage of time based on clock cycles of the processor 110. In some embodiments, the processor 110 executes instructions stored in the memory 115 to perform the methods and routines described herein. The processor 110 is communicatively coupled to the memory 115, the multimedia effect apparatus 125, the input device 130, the output device 135, the image sensor 140, and the network interface 145.

The memory 115, in one embodiment, is a computer readable storage medium. In some embodiments, the memory 115 includes volatile computer storage media. For example, the memory 115 may include a random access memory ("RAM"), including dynamic RAM ("DRAM"), synchronous dynamic RAM ("SDRAM"), and/or static RAM ("SRAM"). In some embodiments, the memory 115 includes non-volatile computer storage media. For example, the memory 115 may include a hard disk drive, a flash memory, or any other suitable non-volatile computer storage device. In some embodiments, the memory 115 includes both volatile and non-volatile computer storage media.

In some embodiments, the memory 115 stores data relating to supplementing digital text with multimedia effects, for example, the memory 115 may store e-books, image data, user preferences, multimedia effects, tables/databases correlating multimedia effects with narrative context, and the like. In some embodiments, the memory 115 also stores program code and related data, such as an operating system or other controller algorithms operating on the electronic device 105.

In certain embodiments, the electronic device 105 may include an e-reader module 120. The e-reader module 120, in one embodiment, is configured to display an electronic book ("e-book") or other digital text on the electronic device 105. In certain embodiments, the reader module 120 controls the output device 130 to display the digital text. The e-reader module 120 may load an e-book or other digital text from the memory 115 and present portions of the e-book/digital text to the user. In certain embodiments, the reader module 120 may receive input data from the input device 1304 navigating within the e-book/digital text.

The multimedia effect apparatus 125, in one embodiment, is configured to supplementing the e-book and/or digital text with one or more multimedia effects. The multimedia effect apparatus 125 may automatically identify current reading position, determine a narrative context at the current reading position, and select one or more multimedia effects based on the narrative context. The narrative context may relate to actions, emotions, themes, settings, locations, and the like within the e-book/digital text. The multimedia effect apparatus 125 may parse the e-book text to the current reading position for keywords indicative of the narrative context. The multimedia effects may include music, sound effects, background images/animations, color schemes, avatars, brightness levels, color schemes, background voices, and the like. The multimedia effect apparatus 125 selects particular multimedia effects to accompany the e-book/digital text.

In some embodiments, the multimedia effect apparatus 125 may match the multimedia effect to a genre of the book (e.g., mystery, science fiction, thriller, fantasy, romance, memoir, unit adult, etc.). Specific paragraphs are keywords a trigger matching music, sound effects, or other multimedia effects to enhance the reading experience of the e-book/digital text. In certain embodiments, the multimedia effect apparatus 125 may identify images within the e-book/digital text and match the images with keywords that can be used to select multimedia effects.

In one embodiments, the multimedia effect apparatus 125 may present multimedia effects of a specific point in time, such as when the reader reaches a specific location within the e-book. In another embodiment, the multimedia effect apparatus 125 may present multimedia effects in response to a trigger event, such as the user selecting an icon, link, or button. In further embodiments, the multimedia effect apparatus 125 may terminate the multimedia effect in response to certain stop conditions, such as the user reaching the end of a chapter, closing the e-reader module 120, or the like.

In certain embodiments, the electronic device 105 may include an input device 130. The input device 130, in one embodiment, may include any known computer input device including a touch panel, a button, a keyboard, a stylus, a microphone, or the like. In some embodiments, the input device 130 may be integrated with the output device 135, for example, as a touchscreen or similar touch-sensitive display. In some embodiments, the input device 130 includes a touchscreen such that text may be input using a virtual keyboard displayed on the touchscreen and/or by handwriting on the touchscreen. In some embodiments, the input device 130 includes two or more different devices, such as a keyboard and a touch panel.

The output device 135, in one embodiment, may include any known electronically controllable display or display device. In further embodiments, the output device 135 may be designed to output audible and/or haptic signals. In some embodiments, the output device 135 includes an electronic display capable of outputting visual data to a user. For example, the output device 135 may include, but is not limited to, an LCD display, an LED display, an OLED display, a projector, or similar display device capable of outputting images, text, or the like to a user. As another, non-limiting, example, the output device 135 may include a wearable display such as a smart watch, smart glasses, a heads-up display, or the like. Further, the output device 135 may be a component of a smart phone, a personal digital assistant, a television, a table computer, a notebook (or laptop) computer, a personal computer, a vehicle dashboard, or the like.

The output device 135 may receive image data for display from the processor 110, the memory 115, the e-reader module 120, and/or the multimedia effect apparatus 125. For example, the e-reader module 120 may communicate text data of an electronic book to the output device 135 for displaying to the user. As another example, the multimedia effect apparatus 125 may communicate visual data to the output device 135 relating to a multimedia effect for enhancing the electronic book.

In one embodiment, the output device 135 includes one or more speakers for producing sound. For example, the output device 135 may produce an audible alert or notification (e.g., a beep or chime). In some embodiments, the output device 135 includes one or more haptic devices for producing vibrations, motion, or other haptic feedback. In some embodiments, all or portions of the output device 135 may be integrated with the input device 130. For example, the input device 130 and output device 135 may form a touchscreen or similar touch-sensitive display. In other embodiments, the output device 135 may be located near the input device 130.

In certain embodiments, the electronic device 105 may include an image sensor 140. The image sensor 140, in one embodiment, may be any sensor capable of capturing image data. For example, the image sensor 140 may include a digital camera, a scanner, an imager, or other suitable image capture device. In some embodiments, the image sensor 140 may face the user of the electronic device 105. Thus the image sensor 140 may capture image data relating to the user's head position, face position, ocular position, or the like. In other embodiments, the image sensor 140 may be worn by the user and may face a book or e-reader being read by the user. Thus, the image sensor 140 may capture reading location data relating to a location in the book or the reader being currently read by the user.

In certain embodiments, the electronic device 105 may include a network interface 145. The network interface 145, in one embodiment, comprises software and/or hardware connecting the electronic device 105 to the multimedia server 160, either directly or via the data network 150. For example, the network interface 145 may include a physical network adapter and one or more protocol stacks for sending queries to and receiving responses and/or data from the multimedia server 160 using computer networking protocols. In one embodiment, the network interface 145 may include a wireless networking interface that connects the electronic device 105 to the multimedia server 160 over radio or other wireless communication mediums. In another embodiment, the network interface 145 may include a wired or fiber optic interface for connecting the electronic device 105 to the multimedia server 160. In some embodiments, the network interface 145 is configured to establish secure connections with the multimedia server 160 over the data network 150.

The multimedia server 160, in one embodiment, is a computer server accessible via the data network 150 and is configured to receive a query for multimedia effects, search one or more databases for multimedia effects matching the query, and return one or more matching multimedia effects. The multimedia server 160 may include an effects database 165 correlating multimedia effects with narrative context. The effects database 165, in one embodiment, is a remote database containing a plurality of multimedia effects. In some embodiments, the effects database 165 correlates multimedia effects, such as music, sound effects, background images/animations, color schemes, avatars, brightness levels, background voices, and other multimedia effects, with keywords, themes, emotions, locations, settings, and other narrative context. In certain embodiments, the effects database 165 may include a plurality of components databases, each complement database associating narrative context (e.g., keywords, themes, etc.) with a particular type of multimedia effect (e.g., audio, visual, haptic, etc.).

Figure 2:
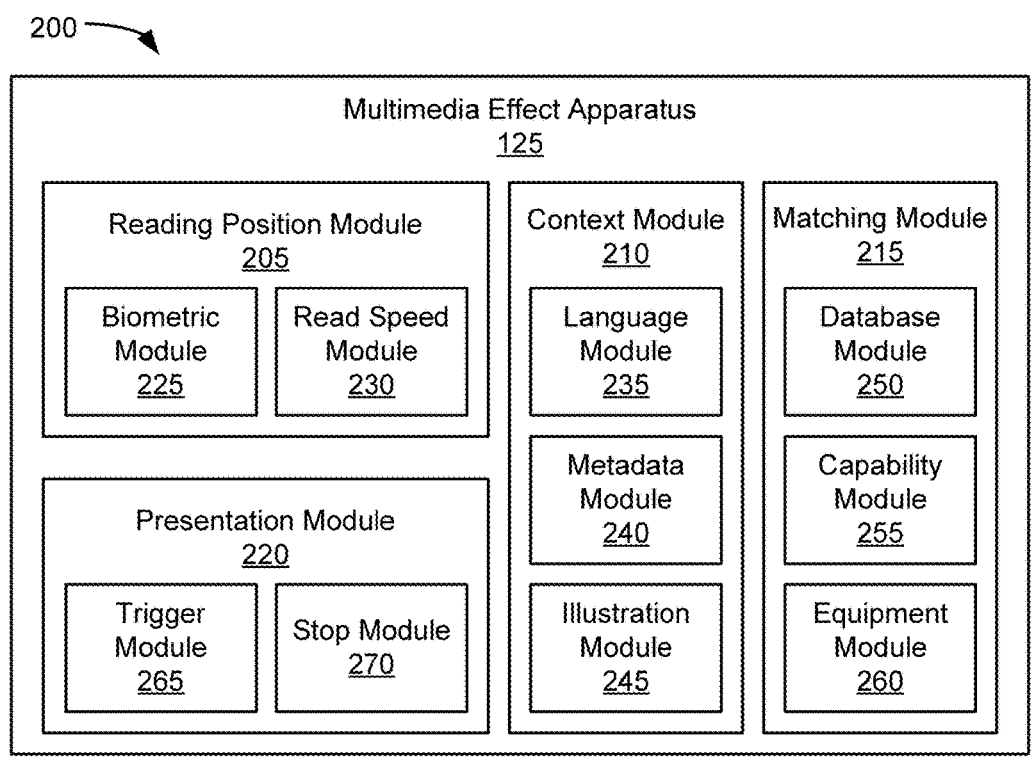
FIG. 2 is a schematic block diagram illustrating one embodiment of an apparatus for supplementing digital text with multimedia effects.

FIG. 2 depicts an apparatus 200 for supplementing digital text with multimedia effects. The apparatus 200 may include a multimedia effect apparatus 125 and may be connectively coupled to the input device 130 that receives input stroke data. As depicted, the multimedia effect apparatus 125 includes a reading position module 205, a context module 210, and a matching module 215. In some embodiments, the apparatus 200 may also include one or more of: a presentation module 220, a biometric module 225, a read speed module 230, a language module 235, a metadata module 240, an illustration module 245, a database module 250, a capability module 255, and an equipment module 260. The modules 205-260 may be connectively coupled to one another. In certain embodiments, each of the modules 205-260 may be implemented in a hardware circuit, as described above. In other embodiments, one or more of the modules 205-260 may be implemented as firmware and/or software, such as program code embedded on computer readable media, as described above.

The reading position module 205, in one embodiment, is configured to determine a current reading position. In some embodiments, the reading position module 205 determines the current reading position based on image data. In one embodiment, the image data includes head position data, face position data, ocular position data, and/or finger position data received from the image sensor 140. In another embodiment, the image data includes a text on a currently viewed page. In certain embodiments, the reading position module 205 regulates the current reading position based on a reading speed of the user. In response to determining the current reading position, the reading position module 205 may communicate the current reading position to the context module 210, the presentation module 220, and/or the memory 115. In certain embodiments, the reading position module 205 continuously updates the current reading position.

As used herein, the current reading position refers to a location in the e-book (or displayed text) corresponding to where the user is reading. The current reading position may be a current chapter, a current page, a current paragraph, a current sentence, and/or a current word. The precision of the current reading position depends on the capabilities of the electronic device 105. For example, the reading position module 205 may determine the current reading position to a high level of precision (e.g., to a current sentence and/or current word) in response to the electronic device 105 including a high-definition, user-facing camera and appropriate software for identifying the user's ocular position to a high level of precision. As another example, the reading position module 205 may determine the current reading position to a lower level of precision (e.g., to a current page or paragraph) in response to the electronic device 105 being capable only of detecting the user's head/face position or in response to the electronic device 105 being a wearable device used to monitor text read on a remote device, such as a separate e-reader device or physical book, periodical, etc.

In some embodiments, the reading position module 205 identifies the current reading position with respect to a reference position, such as a chapter end or page end. For example, the current reading position may be expressed as a distance (e.g., number of paragraphs, sentences, or words) from the end of chapter. The reference position may be useful by the matching module 215 in selecting a multimedia effect. As discussed above, in some embodiments, the reading position module 205 may identify a current reading position based on biometric position data and/or the users reading speed. In certain embodiments, the reading position module 205 may include one or more submodules, such as the biometric module 225 and/or the read speed module 230 for performing the above functions.

The biometric module 225, in one embodiment, determines biometric position data usable by the reading position module 205 to identify the current reading position. As used herein, biometric position data refers to position data relating to a user's body useful in determining where the user is looking/reading. The biometric position data, in one embodiment, is dynamic data, such that the biometric position data changes over time. The biometric position data may include head/face position data, ocular position data, finger position data, and the like. Head and/or face position data may provide coarse reading position information by using height, neck orientation, nose orientation, and other facial features to estimate where the user is looking. In contrast, ocular position data may provide fine reading position information by using ocular features, such as pupil location or retina location, to determine where the user is looking. Using ocular position data, the biometric module 225 is able to more precisely determine where the user is looking.

In some embodiments, the biometric module 25 determines biometric position data using image data received from the image sensor 140. For example, the image sensor 140 may capture images of the user's head, face, and/or eyes, wherein the biometric module 225 determines head position data, face position data and/or ocular position data from the image data. In other embodiments, the biometric module 225 determines biometric position data using input data received from the input device 130. For example, the input device 130 may capture finger touch data, wherein the biometric module 225 determines finger position data from the finger touch data. In certain embodiments, the biometric module 225 determines the biometric position data using combinations of image data and input data. For example, the biometric module 225 may identify user gestures, such as a finger tracing text on a display, from a combination of image data received via the image sensor 140 and touch data received via the input device 130.

In some embodiments, the biometric module 225 interprets the biometric position data to determine where the user is looking and determine a section of displayed text corresponding to where the user is looking. For example, head/face position data may be used to identify an orientation of the head/face with respect to the display. The biometric module 225 may use the head/face orientation to determine a location on a display where the user is looking. As another example, ocular position data may be used to measure a point of gaze. The biometric module 225 may use the point of gaze to determine a location on the display where the user is looking. In further embodiments, the biometric module 225 may identify when the user looks away from the display.

In some embodiments, the biometric module 225 interprets image data and/or biometric position data to determine where a user is pointing and/or where the user's finger is touching. A user may indicate a current reading position by touching, pointing, or otherwise indicating a section of text with their finger. Thus, the biometric module 225 may use the finger location or pointing location to determine a section of displayed text corresponding to the current reading position.

The read speed module 230, in one embodiment, determines a reading speed of the user. As used herein, the reading speed of the user refers to an average rate at which the user reads text on the output device 135. In some embodiments, the read speed module 230 uses biometric position data, for example ocular movement data or finger motion data, to determine the reading speed of the user. For example, as the user reads from left to right, the read speed module 230 may track smaller rightward ocular movements corresponding to the user's gaze moving along words in a line of text and larger leftward ocular movements corresponding to the user's gaze moving from the end of one line to the beginning of the next line. The read speed module 230 may use timestamps associated with the ocular movements to calculate and/or estimate a reading speed, such as an average number of words per minute, lines of text per minute, or the like.

In other embodiments, the read speed module 230 uses information relating to when a user turns a page (e.g., increments a page number), scrolls to a new portion of text, touches the screen (e.g., a finger tracing a reading position), or other data to determine the user's reading speed. For example, the read speed module 230 may monitor for user inputs controlling which sections of text are displayed (e.g., page turning motions or scrolling motions). In still further embodiments, the read speed module 230 may prompt the user to enter his/her reading speed and/or may receive the user's reading speed from another device, module, application, or the like.

In certain embodiments, the read speed module 230 regularly determines the user's reading speed (e.g., tracks ocular movements, page turns, etc., and calculates and/or estimates the reading speed at regular intervals). As a user may read different works at different speeds (e.g., a different reading speed for fiction than for technical manuals) and/or may read different portions of a work at different speeds (e.g., a different reading speed for dialogue than for descriptive passages), the read speed module 230 may regularly update the user's reading speed. In further embodiments, the read speed module 230 may track the user's reading speed, for example tracking different reading speeds for different genres, at different times of day, for different fonts/typefaces, or other factor affecting reading speed. After collecting sufficient data, the read speed module 230 may then predict the user's reading speed for a given portion of text.

In some embodiments, the read speed module 230 provides the determined reading speed to the reading position module 205, wherein the reading position module 205 uses the determined reading speed to identify a current reading position. For example, the reading position module 205 may determine an elapsed time from the user reaching a reference position (e.g., beginning of a chapter, page, or paragraph) and determine the current reading position based on the elapsed time and on the reading speed determined by the read speed module 230. In further embodiments, the reading position module 205 may use the determined reading speed to verify the current reading position and/or to more accurately identify the current reading position.

In certain embodiments, the read speed module 230 provides the determined reading speed to the presentation module 220, wherein the presentation module 220 presents the multimedia effect a specific time based, at least in part, on the determined reading speed. For example, where the multimedia effect is a sound effect (e.g., squealing tires during a chase scene), the presentation module 220 may begin and/or and the sound effect at specific times based on the reading speed.

The context module 210, in one embodiment, is configured to determine a narrative context based on the current reading position. As used herein, the narrative context refers to an idea, action, theme, emotion, a setting, or event in the e-book or displayed text. The narrative context varies within the e-book or displayed text from location to location. For example, different chapters within the e-book may include different themes and settings. As another example, different paragraphs within the e-book may include different actions and events. The context module 210 may further identify a genre associated with the e-book or displayed text. The context module 210 provides the narrative context to the matching module 215, wherein the matching module 215 selects a multimedia effect based on the narrative context.

In some embodiments, the narrative context may be a keyword at or near the current reading position. As used herein, "at or near the current reading position" refers to the keyword being within a predetermined distance from the current reading position. For example, the keyword may be in the sentence following the current reading position (e.g., the next sentence). As another example, the keyword may be within the same paragraph as the current reading position. Thus, the context module 210 may be configured to examine words, phrases, and sentences ahead of the current reading position and to identify keywords, themes, topics, actions, events, locations, and the like, within the examined text.

For example, the context module 210 may identify the narrative context in the form of an action near the current reading position, such as a door opening/closing, footsteps, a phone ringing, and the like. As another example, the context module 210 may identify the narrative context in the form of a theme, topic, or emotion near the current reading position, such as anger, disgust, fear, sadness, longing, serenity, and the like. In yet another example, the context module 210 may identify the narrative context in the form of an event or location near the current reading position, such as a ballgame, a home, a park, a party, and the like. In a further embodiment, the context module 210 may identify a combination of actions, emotions, events, and the like associated with the current reading position, wherein the narrative context includes the combination of actions, emotions, events, etc.

In some embodiments, the context module 210 uses a natural language analysis context of the current reading position to identify one or more keywords and determines the narrative context based on the keyword(s). In some embodiments, the context module 210 searches for metadata associated with the current reading position and determines the narrative context based on the metadata. In certain embodiments, the context module 210 searches for illustrations near the current reading position and determines the narrative context based on the illustrations. The context module 210 may include one or more submodules, such as the language module 235, the metadata module 240, and/or the illustration module 245 for performing the above functions, as described in detail below.

The language module 235, in one embodiment, is configured to perform a language analysis of text near the current reading position in order to identify a narrative context for the current reading position. In one example, the reading position module 205 may provide the context module 210 with the current reading position, wherein the language module 235 uses natural language processing, or other linguistic analysis algorithm, to identify the narrative context. In some embodiments, the language module 235 may analyze a phrase, clause, sentence, line, paragraph, or the like, associated with the current reading position.

In one embodiment, the language module 235 identifies one or more keywords within the text associated with the current reading position. In another embodiment, the language module 235 may identify a theme, topic, or motif of the text associated with the current reading position. In still another embodiment, the language module 235 may identify an emotion from the text associated with the current reading position. The language module 235 may provide the keywords, theme, emotion, or the like to the context module 210, wherein the context module 210 determines the narrative context based on the provided keywords, theme, emotion, etc.

The metadata module 240, in one embodiment, is configured to identify metadata associated with the current reading position. The metadata module 240 may then provide the metadata to the context module 210, wherein the context module 210 determines the narrative context of the current reading position based, at least in part, on the metadata. In certain embodiments, the metadata module 240 may filter the identified metadata for metadata relevant to the narrative context, wherein the metadata module only provides to the context module 210 that metadata which is relevant to the narrative context.

As an example, one or more metadata tags may be embedded, or otherwise associated with, the reading text. Metadata tags may relate to page numbers, themes, actions, events, or the like within the reading text. The metadata tags may be associated with certain portions of the reading text, for example specific words, paragraphs, chapters, etc. The metadata module 240 identifies these metadata tags corresponding to text associated with the current reading position, filters the metadata tags for metadata relevant to a narrative context (e.g., filters out tags relating to page number or the like), and provides the remaining metadata tags to the context module 210 for determining a narrative context of the current reading position.

In certain embodiments, an author of the e-book may provide metadata within the e-book to provide an intended multimedia experience from the author's point of view. Provided metadata may indicate background music, sound effects, background images, or the like. In some embodiments, the provided metadata may include links to specific multimedia effects for presentation with the e-book. In further embodiments, other readers of the book may customize and share the metadata. In certain embodiments, the metadata module 240 may search the multimedia server 1604 metadata related to the current reading position.

The illustration module 245, in one embodiment, is configured to identify illustrations associated with the current reading position (e.g., near the current reading position). As used herein, an illustration in a reading text refers to a drawing, figure, picture, image, artwork, photograph, or other graphical representation within the reading text. In some embodiments, the illustration may be associated with a caption (e.g., an explanatory text) describing said illustration. In other embodiments, the illustration may be presented within the reading text without a caption.

In one embodiment, the illustration module 245 identifies the illustrations using tags or other metadata indicators. The illustration module 245 may then identify a location in the e-book to which the illustration is linked (associated) and compare the illustration location to the current reading position. In another embodiment, the illustration module 245 scans and parses an e-book file to identify illustrations and their locations. For example, the illustration module 245 may parse the e-book file in response to the e-reader application loading the e-book file and create a list of illustration locations, wherein the illustration module 245 later refers to the list of illustration locations when identifying illustrations associated with the current reading position.

The illustration module 245, in one embodiment, is configured to determine at least one keyword associated with the identified illustration, wherein the context module 210 identifies the narrative context of the current reading position based, at least in part, on the at least one keyword. For example, the illustration module 245 may associate the illustration with at least one keyword and provide the same to the context module 210. In some embodiments, the at least one keyword may be selected from and/or derived from a caption associated with the illustration. In other embodiments, the illustration module 245 may use an image processing algorithm to identify certain items and/or actions depicted by the illustration, wherein the at least one keyword matches a depicted item and/or action.

The matching module 215, in one embodiment, is configured to select a multimedia effect based on the narrative context. As used herein, a multimedia effect refers to a multimedia presentation supplementing the text in the e-book. The multimedia effect may be an image, music, a sound effect, an animation, a color scheme, a hyperlink, an avatar, and the like. In some embodiments, the multimedia effect includes audible sound, such as a sound effect and/or background music. In some embodiments, the multimedia effect includes a visual, such as a background image, a foreground image, an animation, an avatar representing a character, and similar. In certain embodiments, the multimedia effect may include haptic feedback and/or vibrations.

In one example, the current reading position may include a sentence that reads: "The door slammed shut" or "The birds chirp as a gentle breeze blew," wherein the context module 210 identifies "door slammed" or "birds chirp" as keywords of the narrative context. The matching module 215 may select a sound effect of doors being slammed or of birds chirping, while the presentation module 220 may play the sound effects. In certain embodiments, the memory 115 maintains a database of sound effects and keywords, so that the matching module 215 may select appropriate sound effects. In other embodiments, electronic device 105 may query a remote database (such as the effects database 165) to acquire appropriate sound effects.

In another example, the current reading position may include the death of a character, wherein the matching module 215 may select tragic and/or ominous music to play in the background. The presentation module 220 may play the background music during the paragraphs/passages relating to the character's death. In a related example, the current reading position may depict a character playing or otherwise engaged and happy activity. The matching module 215 may select happy and/or playful music to play in the background. Again, the presentation module 220 may play the background music during the paragraphs/passages relating to the characters happy/playful mood. As will be appreciated, additional multimedia effects, such as sound effects and/or visual effects, relating to actions may be presented by the background music is being played by the presentation module 220.

In yet another example, the current reading position include dialogue where various characters speak to one another. In one embodiment, the matching module 215 may select background avatars for each character, wherein the presentation module 220 may display a background avatar behind or adjacent to the text as each character speaks. Alternatively, the matching module 215 may select a color scheme for each character, wherein the presentation module 220 displays the corresponding color scheme as each character speaks.

In a related example, different background voices may be associated with each character, wherein the different background voices are presented as the user reads the spoken dialogue. A tone/pitch of the background voice may indicate a gender, nationality, or other characteristic of the character. In one embodiment, the background avatar, color scheme, and/or background voice may stay the same throughout the book and/or series In one embodiment, the matching module 215 selects multimedia effect based on the location of the current reading position with respect to a chapter end and/or book end. For example, as a reader starts the first chapter, the matching module 215 may select accounting music. In one embodiment, metadata associated with the current reading position may indicate the company music and also indicate that what reading position the music should and and/or change. As another example, as the reader gets the end of the book the matching module 215 may select music based on the narrative tone of the book ending (e.g., whether the characters feel happy/sad, whether the ending is a cliffhanger, etc.). The matching music may be played such that the volume increases after the user reads last words of the book, as is typical in movies. In a further embodiment, the user's reading speed may be used in conjunction with the current reading position to determine when the music and/or volume changes.

In some embodiments, the matching module 215 selects visual multimedia effects to supplement the e-book. In one embodiment, the matching module 215 may select a display brightness based on the narrative context. For example, as a character screams, the matching module 215 may increase the screen brightness. In another embodiment, the matching module 215 may select a text/background color based on the narrative context. For example, as a character stabbed, the background and/or displayed text return a blood-red color or red spots may appear in the background. In some embodiments, the matching module 215 may select a background image based on the narrative context. For example, if a character picks up a baseball bat (or other object), a background image corresponding to the baseball bat (or other object) may be shown behind the current reading position or, alternatively, adjacent to the current reading position.

The matching module 215 receives a narrative context from the context module 210 and selects an appropriate multimedia effect based on the narrative context. For example, where the narrative context includes keyword, the matching module 215 may select a sound effect or visual image associated with the keyword. The matching module 215 may access one or more lists or databases associating multimedia effects with keywords, themes, actions, etc. These lists/databases may be stored locally (e.g., in the memory 115) and/or remotely (e.g., in the effects database 165).

In some embodiments, the matching module 215 may select a particular multimedia effect from among a plurality of candidate multimedia effects. The matching module 215 may select the particular multimedia effect based on its relevance, upon capabilities of the electronic device 105, or upon other criteria as described below. In certain embodiments, the matching module 215 may prioritize certain forms of multimedia for actions (e.g., sound effects and/or animations) and prioritize different forms of multimedia for settings (e.g., background image and/or background music). Further, the matching module 215 select a plurality of multimedia effects based on the narrative context. For example, where the context module 210 provides both an action and a theme as part of the narrative context, the matching module 215 may select one multimedia effect for the action and another multimedia effect for the theme.

In certain embodiments, the matching module 215 may filter candidate multimedia effects based on a genre of the e-book. For example, two or more background music effects may be candidate multimedia effects for a theme identified by the context module 210, wherein the matching module 215 selects a particular background music effect based on the genre of the e-book. In a further embodiment, the matching module 215 may filter candidate multimedia effects based on a location within the chapter of the current reading position. For example, the matching module 215 may select a shorter duration multimedia effect if the current reading position is within a threshold distance to the end of chapter.

In certain embodiments the matching module 215 identifies a user multimedia preference and selects a multimedia format based on the user multimedia preference. For example, a user may prefer not to have visual effects presented with the text of the e-book, wherein the matching module 215 only selects audible and/or haptic effects based on the user preference. In response to selecting a multimedia effect, in one embodiment, the matching module 215 may download the selected multimedia effect and/or load the selected multimedia effect into RAM. The matching module 215 may further indicate to the presentation module 220 that a multimedia effect is ready for presentation.

In some embodiments, selecting a multimedia effect based on the narrative context includes querying the remote database for a multimedia effect corresponding to the narrative context, selecting a multimedia effect based on the device capability, and/or selecting a multimedia effect based on the external multimedia equipment. In certain embodiments, the matching module 215 may include one or more submodules, such as the database module 250, the capability module 255, and/or the equipment module 260 for performing the above functions.

The database module 250, in one embodiment, is configured to query a remote database for multimedia effect corresponding to the narrative context. In some embodiments, the database module 250 queries a database hosted by the multimedia server 160. The database module 250 may use the network interface 145 to communicate with the multimedia server 160 via the data network 150. In certain embodiments, the database module 250 queries the remote database for multimedia effects by sending a keyword, a theme, an emotion, or the like, wherein the remote database responds with one or more multimedia effects matching the keyword, theme, emotion, etc. In certain embodiments, the response from the remote database includes the one or more multimedia effects. In other embodiments, the response from the remote database merely indicates (e.g., provides links to and/or identification for) the one or more multimedia effects.

In some embodiments, the database module 250 downloads one or more multimedia effects from the multimedia server 160. In certain embodiments, the database module 250 downloads multimedia effects returned by the remote database in response to the query. For example, the database module 250 may receive the response from the remote database, wherein the database module 250 connects to the multimedia server 160 and downloads one or more multimedia effects indicated in the response. In other embodiments, the database module 250 connects to the multimedia server 160 in response to selecting a multimedia effect corresponding to the narrative context, wherein the database module 250 downloads the selected multimedia effect.

The capability module 255, in one embodiment, is configured to identify a device capability, such as a capability of electronic device 105 for presenting a multimedia effect. The capability module 255 may identify the device capability by examining hardware of the electronic device 105, examining software of the electronic device 105, or the like. In certain embodiments, the capability module 255 may have a predetermined list of possible device capabilities, wherein the capability module 255 determines, for each capability on the list, whether the electronic device 105 has that capability. In other embodiments, the matching module 215 may query the capability module 255 for a device capability of the electronic device 105 based on a candidate multimedia effect.

In some embodiments, the device capability indicates an ability of the electronic device 105 to present a certain type of multimedia effect. Examples of device capabilities include, but are not limited to, the electronic device 105 being capable of playing audible sounds, providing haptic feedback, presenting background images, presenting animations, presenting hyperlinks, and the like. In some embodiments, the device capability indicates an ability of the electronic device 105 to present a multimedia effect at a particular time. For example, the device capability may indicate whether the electronic device 105 is capable accurately identify a time at which the user reads a specific word. This capability may be indicated by specific hardware (e.g., a camera or ocular tracking sensors) and/or software (e.g., image processing software) being present in the electronic device 105.

In response to identifying the device capabilities, the capability module 255 may indicate one or more device capabilities to the matching module 215, wherein the matching module 215 selects a multimedia effect based, at least in part, on the one or more device capabilities. For example, certain multimedia effects may be presentable only if specific hardware and/or software is present on the electronic device 105, wherein the device capabilities indicated by the capability module 255 prevent the matching module 215 from selecting multimedia effects that the electronic device 105 is incapable of presenting. Thus, the matching module 215 may select only multimedia effects that the electronic device 105 is capable of presenting in response to the capability module 255 detecting the capabilities of the electronic device 105.

The equipment module 260, in one embodiment, is configured to detect external multimedia equipment coupled to the electronic device 105. As used herein, external multimedia equipment refers to devices, apparatus, or other equipment communicatively connected to the electronic device 105, but not integrated with the electronic device 105. Examples of external multimedia equipment include, but are not limited to, speakers, headphones, projectors, lights, displays, and the like. In response to detecting external multimedia equipment, the equipment module 260 indicates the external multimedia equipment to the matching module 215, wherein the matching module 215 selects a multimedia effect based on the external multimedia equipment.

In some embodiments, the external multimedia equipment detected by the equipment module 260 may indicate that the electronic device 105 has the capability to present certain types/formats of multimedia effects. In other embodiments, the external multimedia equipment may be associated with certain user preferences for presenting multimedia effects. For example, the equipment module 260 may detect that headphones are connected to the electronic device 105, wherein the user may indicate a preference for presenting audible multimedia effects only when headphones are connected to the electronic device 105. Thus, the matching module 215 may select audible multimedia effects in response to the equipment module 260 detecting that headphones are connected to the electronic device 105 and otherwise filter out audible multimedia effects in response to equipment module 260 detecting that headphones are not connected to the electronic device 105.

In certain embodiments, user preference may supplement the presence of external multimedia equipment. For example, a user may indicate a preference to only deliver certain types/formats of multimedia effects when headphones are connected and to not deliver those types/formats of multimedia effects when external speakers are connected. Thus, without headphones connected, a user may desire to suppress music and/or sound effects so as to not bother bystanders. Conversely with headphones connected, the user may prefer music and/or sound effects.

The presentation module 220, in one embodiment, is configured to present the multimedia effect to a user. The presentation module presents the multimedia effect via the output device 135. In some embodiments, the presentation module 220 displays a link and presents the multimedia effect in response to the user selecting the link. For example, the presentation module 220 may display a button or icon near the current reading position and display an image, picture, etc. in response to the user clicking on the button or icon. As another example, the presentation module 220 may create a hyperlink over a keyword and present multimedia effect in response to the user selecting the hyperlink.

In certain embodiments, the presentation module 220 a pre-cache the selected multimedia effect. For example, the presentation module 220 may load into memory 115 the multimedia effect selected by the matching module 215. At a later point in time, the presentation module 220 may cause the output device 135 to present the multimedia effect preloaded into memory 115. For example, presentation module 220 may pre-cache the multimedia effect in response to the matching module selecting set multimedia effect, and may further signal the output device 135 to present the multimedia effect in response to a predetermined trigger, such as the user reaching a specific location within e-book or selecting a button/link.

In one embodiment, presentation module 220 may deliver selected multimedia effects as a notification while the user reads. For example, the presentation module 220 may deliver a button, icon, link, or the like as the user reaches a certain reading position. In response to the user selecting the button, icon, link, or the like, the presentation module 220 may then present the multimedia effect.

In some embodiments, the presentation module 220 is configured to present the multimedia effect at a presentation time. For example, where they multimedia effect is associated with the keyword ahead of the current reading position, the presentation module 220 present a multimedia effect when the user reaches the keyword. In certain embodiments, the presentation module 220 receives an updated current reading position from the reading position module 205 so as to present the multimedia effect when the user reaches the keyword.

The presentation module 220 may present multimedia effect based on user preferences as to volume levels, brightness levels, or other output levels. In certain embodiments, the presentation module 220 is configured to present the multimedia effect based on an environmental factor, such as an ambient light condition, an ambient noise condition, or the like. The presentation module 220 may measure the ambient conditions (e.g., light, sound, etc.) and adjust a volume, brightness, or other output level based on the ambient condition. In some embodiments, the presentation module 220 is configured to present a multimedia effect based on a device condition, such as a battery level, a processor load level, network availability, or the like. For example, where the battery levels low and/or the processor load level is high, the presentation module 220 may avoid presenting animations, videos, or other multimedia effects with high power consumption and/or processor load.

In certain embodiments, the presentation module 220 may be configured to suppress certain types of multimedia effects based on current location of the electronic device 105 or a time of day. For example, if the electronic device 105 is located within a quiet zone (e.g., a library) as determined by the GPS receiver communicatively coupled to the electronic device 105, then the presentation module 220 may suppress presentation of sound effects, background music, or other audible multimedia effects unless headphones are connected to the electronic device 105. As another example, if the time of day is during that time, the presentation module 225 may suppress bright images and/or loud sounds/music so as to avoid disturbing sleeping individuals.

In some embodiments, the presentation module 220 may be configured to present a plurality of multimedia effects simultaneously or near simultaneously. For example, presentation module 220 may be configured to present sound effects of simultaneously presenting a visual effect, such as a background image or animation. The presentation module 220 may be further configured to prevent confusing the user by presenting several multimedia effects of a similar type at the same time or within a short time period. For example, presentation module 220 may present plurality of images at the same time, but in different locations, or in close sequence, so as to avoid overwhelming the user. As another example, the presentation module 220 may present sound effects and background music at the same time, but prevent sound effects from overlapping, so as to avoid overwhelming and/or confusing the user.

In one embodiment, the presentation module 220 presents the multimedia effect in response to detecting a triggering event. In another embodiment, the presentation module 220 ceases presenting the multimedia effect is response to detecting a stop condition. In certain embodiments, the presentation module 220 may include one or more submodules, such as the trigger module 265 and/or the stop module 270 for performing the above functions.

The trigger module 265, in one embodiment, is configured to monitor for a triggering event, wherein the presentation module 220 presents the multimedia effect in response to the trigger module 265 detecting the triggering effect. In some embodiments, the trigger is the user reaching a specific keyword within the text presented by the e-reader module 120. When the user reaches the specific keyword, the trigger module 265 may signal the presentation module 220 to present the multimedia effect. For example, the specific keyword may a keyword used to select multimedia effect, wherein the presentation module 220 outputs the multimedia effect in response to user reaching the specific keyword.

In certain embodiments, the trigger module 265 determines whether the user is reached the specific keyword by monitoring the current reading position. For example, as the current reading position is updated by the reading position module 205, the trigger module 265 may determine whether the specific keyword is within a predetermined distance of the current reading position. In one embodiment, where the current reading position is determinable on a word-by-word basis and the predetermined distance is zero (meaning the current reading position is at the specific keyword). In another embodiment, the predetermined distance is met when the current reading position is past the specific keyword (e.g., the specific keyword occurs earlier in the text than the current reading position).

In other embodiments, the trigger is a specific point in time, wherein the trigger module 265 signals the presentation module 220 to present multimedia effect in response the specific point in time being reached. In certain embodiments, the specific point in time is calculated such that the reader reaches a predetermined location in the e-book or text at the specific point in time. The predetermined location is associated with the multimedia effect, for example a chapter beginning, a keyword, a change in narrative location, or the like. In one embodiment, the user's reading speed is used to determine the specific point in time. In a further embodiment, the current reading position is used to determine a specific point in time.

In one embodiment, the trigger module 265 uses a timer to track the passage of time. For example, the trigger module 265 may use a timer in the processor 110. The timer may be set such that the timer expires at the specific point in time. In response to the timer expiring, the trigger module 265 may signal the presentation module 220 present the multimedia effect. In another embodiment, the trigger module 265 uses a clock to track the passage of time. For example, the trigger module 265 may use a clock in the processor 110. In response to a clock value reaching the specific point time, the trigger module 265 may signal the presentation module 220 present the multimedia effect.

The stop module 270, in one embodiment, is configured to monitor for a stop condition, wherein the presentation module 220 ceases presenting the multimedia effect in response to the stop module 270 detecting the stop condition. The stop condition, in various embodiments, may include a specific point in time, a specific location within the text or e-book, the user switching away from the e-reader application, an input command, an interruption from another application executing on the electronic device 105, or the like.

Previous In some embodiments, stop module 270 tracks the passage of time and signals the presentation module 220 to cease presenting the multimedia effect when a predetermined amount of time has passed. In a further embodiment, the stop module 270 exactly to stop time and signal the presentation module 220 when the stop time is reached. For example, a stop time for a multimedia effect comprising background music may be determined (e.g., after one minute of presentation), wherein the stop module 270 signals the presentation module 220 to cease presenting background music when the stop time is reached. The stop module 270 may use a timer and/or clock of the processor 110 to track passage of time.

In some embodiments, the stop module 270 tracks the current reading position and signals the presentation module 220 to cease presenting the multimedia effect when a predetermined location in the text and/or e-book is reached. For example, the stop module 270 may terminate the multimedia effect at the end of a chapter, as determined based on the current reading position. In one embodiment, stop module 270 may signal the presentation module 220 to transition to the end of the chapter causing background music to decrease in volume until muted.

In certain embodiments, the stop module 270 may signal the presentation module 220 to cease presenting a first multimedia effect in response to a second multimedia effect being presented. Thus, the stop module 270, in certain embodiments, may be used to prevent unwanted overlap of multimedia effects. For example, where multimedia effects of similar types are to be presented closely in time, stop module 270 may prevent unwanted overlap of the multimedia effects by stopping each multimedia effect as a subsequent multimedia effect is to be presented.

In some embodiments, the stop module 270 signals the presentation module 220 to cease presenting a multimedia effect in response to the user closing the e-reader application, moving the reader application to the background, and/or bringing another application to the foreground. In another embodiment, the stop module 270 may signal the presentation module 220 to cease presenting the multimedia effect in response to the user looking away from the reader. In further embodiments, the stop module 270 signals the presentation module 220 to cease presenting the multimedia effect in response to an interruption from of the application and/or process executing on the electronic device 105. For example, where the electronic device 105 is capable of receiving phone calls, the stop module 270 may terminate the multimedia effect in response to an incoming call, an incoming message, or other alert. Additionally, the stop module 270 may terminate the multimedia effect in response to a muting action (such as a key press, gesture, local command, or the like) input by the user.

As described, the multimedia effect apparatus 125 effectively supplements the e-book text by presenting multimedia effects corresponding to narrative of the current reading position. In some embodiments, the multimedia effects are based on a genre of the e-book. For example, certain music, images, fonts, etc. may be associated with mystery novels, while different music, images, fonts, etc. may be associated with fantasy novels, and still further music, images, fonts, etc. may be associated with horror novels. Further, certain multimedia effects may be associated with works of fiction that are not associated with non-fiction.

Figure 3A:
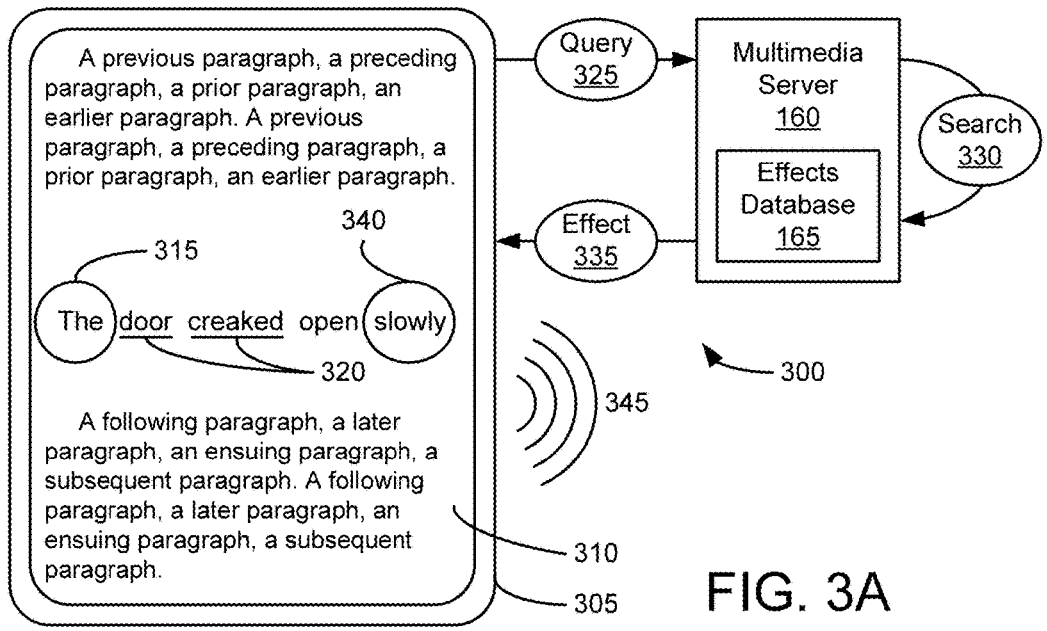
FIG. 3A is a schematic block diagram illustrating one embodiment of supplementing digital text with multimedia effects.
Figure 3B:
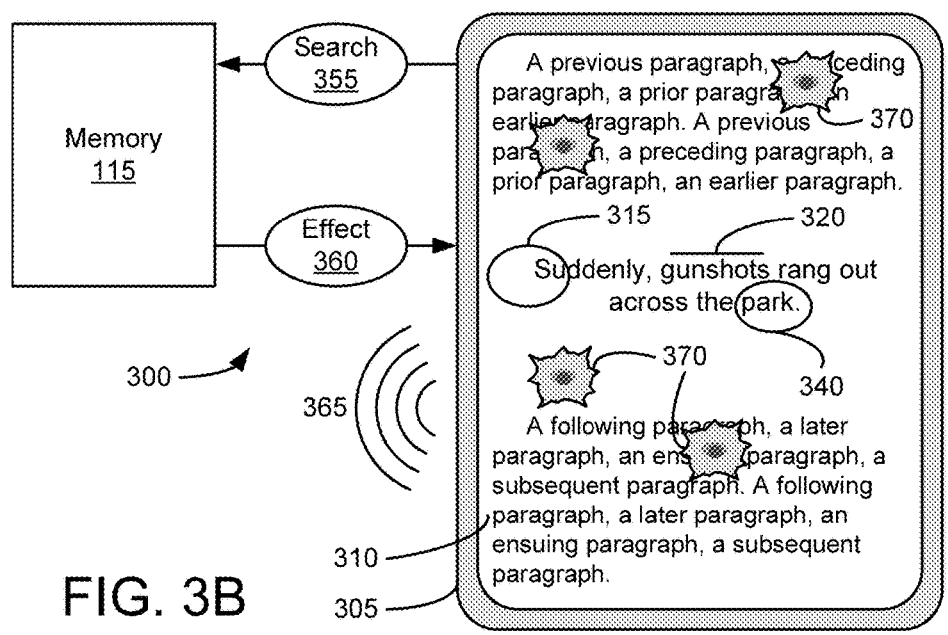
FIG. 3B is a schematic block diagram illustrating one embodiment of supplementing digital text with multimedia effects.

FIGS. 3A-3B depict embodiments of a system 300 for supplementing digital text with multimedia effects. The system 300 includes an e-reader device 305. The e-reader device 305 includes a display screen 310 for displaying text, such as an e-book, and a memory 115. In one embodiment, the key reader device 305 includes a multimedia effect apparatus 125 (not shown), described above with reference to FIGS. 1 and 2. In some embodiments, the system 300 also includes a multimedia server 160, the multimedia server 160 including an effects database 165. The multimedia server 160 and the effects database 165 may be substantially as described above, with reference to FIG. 1.

FIG. 3A is a schematic block diagram illustrating one embodiment of the system 300 producing a multimedia effect based on text currently displayed on the e-reader 305. The text of an e-book is displayed on the display screen 310. The display the text includes a current reading position 315. As depicted, in some embodiments the current reading position 315 is surrounded by one or more previous paragraphs and/or one or more following paragraphs. The current reading position 315 corresponds to a location within the text of e-book where the user is currently looking/reading. As will be appreciated, the current reading position 315 is dynamic and changes as the user reads.

The e-reader 305 identifies a narrative context based on the current reading position 315. In some embodiments, the e-reader 305 looks for one or more keywords 320 associated with the current reading position 315. In the depicted example, the current reading position 315 includes the sentence: "The door creaked open slowly." Here, the e-reader 305 identifies the words "door" and "creaked" as keywords 320 which identify an action within the e-book. As described above, the narrative context may include an action, an event, a situation, a location, and the like.

Having identified keywords 320 of the narrative context, the e-reader 305 sends a query 325 to the multimedia server 160. The query 325 includes the keywords 320 of the narrative context. As will be appreciated, the e-reader 305 may send a plurality of queries 325 to the multimedia server 160 as the current reading position is dynamically updated, and as new keywords 320 are identified (due to dynamic updating of the narrative context). The multimedia server 160 receives the query 325 and searches 330 the effects database 165 for one or more multimedia effects that match the keywords 320. Where the query 325 includes additional narrative context (e.g., genre, setting, etc.), then the multimedia server 160 may search for multimedia effects also matching the additional narrative context.

The multimedia server 160 returns one or more multimedia effects 335. In some embodiments, the returned multimedia effects 335 may include plurality of multimedia effects types, including audio effects, visual effects, haptic effects, and the like. Here, the multimedia server 160 returns a sound effect corresponding to a creaking door 345. In certain embodiments, the e-reader 305 may filter the returned multimedia effects 335, removing any multimedia effects 335 that the e-reader 305 is incapable of presenting. For example, if an animation is included with the returned multimedia effects 335, but the e-reader 305 is not capable of presenting animations (e.g., due to display limitations, processor limitations, etc.), then the e-reader 305 filters out the animation. In some embodiments, the e-reader 305 selects at least one of the returned multimedia effects 335 for presentation to the user.

In some embodiments, the e-reader 305 identifies a trigger 340 for presenting the multimedia effect. In the depicted embodiment, the trigger 340 is the last word in the sentence that includes the current reading position 315. Thus, when the user reaches the end of the sentence, the e-reader 305 will present the multimedia effect. Here, the e-reader 305 plays a sound effect 345 of a creaking door.

FIG. 3B is a schematic block diagram illustrating another embodiment of the system 300 producing a multimedia effect based on text currently displayed on the e-reader 305. As depicted, text of an e-book is displayed on the display screen 310, including a current reading position 315. The e-reader 305 identifies a narrative context based on the current reading position 315, including one or more keywords 320 associated with the current reading position 315. In the depicted example, the current reading position 315 includes the sentence: "Suddenly, gunshots rang out across the park." Here, the e-reader 305 identifies the word "gunshots" as a keyword 320 identifying an action within the e-book. As described above, the narrative context may include an action, an event, a situation, a location, and the like.

Having identified a keyword 320 of the narrative context, the e-reader 305 searches 355 the memory 115 for one or more multimedia effects that match the keyword 320. For example, the memory 115 may include a database of multimedia effects searchable by keyword. As will be appreciated, the e-reader 305 may regularly search 355 the memory 115 as the current reading position is dynamically updated, and as new keywords 320 are identified (due to dynamic updating of the narrative context). Where the e-reader 305 identifies additional narrative context (e.g., genre, setting, etc.), then the e-reader 305 may search the memory 115 for multimedia effects also matching the additional narrative context.

The e-reader 305 identifies one or more multimedia effects 360 stored in the memory 115 and matching the keyword 320. In some embodiments, the identified multimedia effects 360 may include plurality of multimedia effects types, including audio effects, visual effects, haptic effects, and the like. Here, the multimedia effects 360 include a sound effect corresponding to gunshots 365 and an image of a bullet hole. In certain embodiments, the e-reader 305 may filter the returned multimedia effects 360 based on user preference, removing any multimedia effects 360 that the user does not prefer. For example, if an animation is identified as corresponding to the keyword 320 (e.g., "gunshots") and the user does not wish to view animations while reading the e-book, then the e-reader 305 filters out the animation. In some embodiments, the e-reader 305 selects at least one of the identified multimedia effects 360 for presentation to the user.

In some embodiments, the e-reader 305 identifies a trigger 340 for presenting the multimedia effect. In the depicted embodiment, the trigger 340 is the last word in the sentence that includes the current reading position 315. Thus, when the user reaches the end of the sentence, the e-reader 305 will present the multimedia effects 365 and 370. Here, the e-reader 305 plays a sound effect 365 of a gunshots and displays a plurality of bullet holes 370. As will be appreciated, in certain embodiments the e-reader 305 displays the bullet holes 370 in a way that does not interfere with the user reading the e-book. For example, the e-reader 305 may display the bullet holes 370 in the background (e.g., behind the text of the e-book). In another example, the e-reader 305 may display the bullet holes 370 at locations away from the current reading position 315, as depicted.

While the embodiments depicted in FIGS. 3A-3B, show multimedia effects corresponding to actions in the e-book, in other embodiments, the multimedia effects may correspond to settings, locations, characters, or the like. For example, reader 305 may display an image of a location and/or setting of the e-book in response to the narrative switching to the location/setting in the current reading position 315. As another example, the reader 305 may play background music corresponding to a theme, tone, or emotion present in the current reading position 315.

Figure 4A:
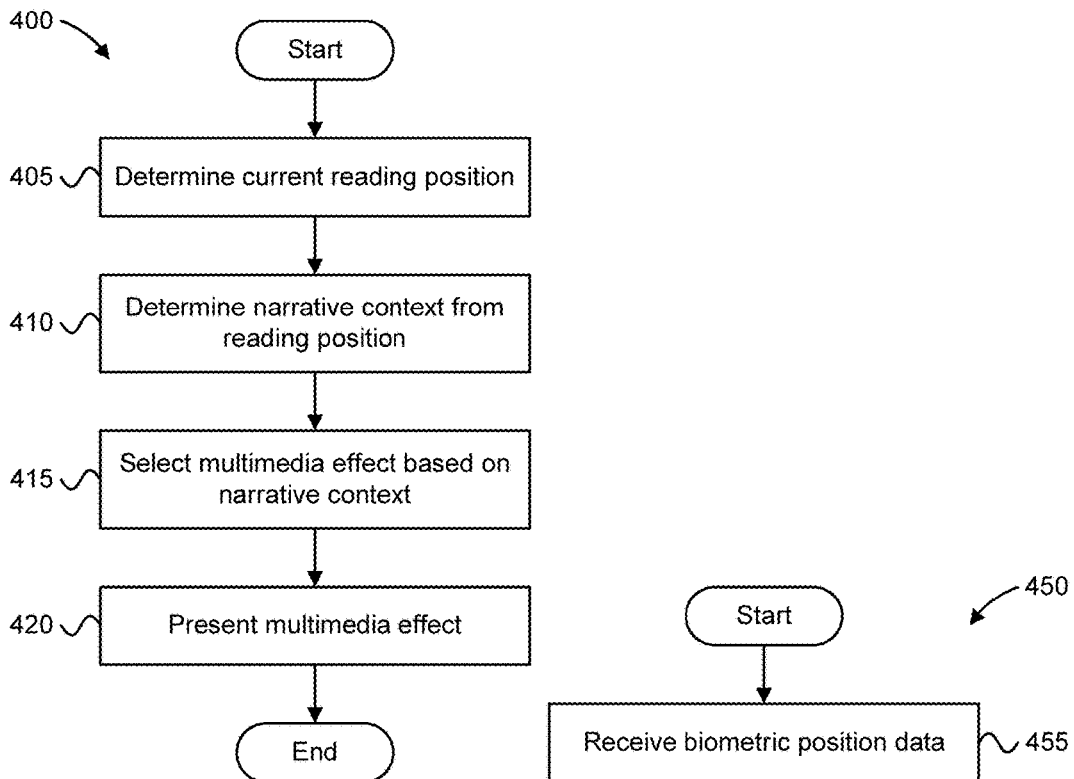
FIG. 4A is a flow chart diagram illustrating one embodiment of a method for supplementing digital text with multimedia effects.

FIG. 4A is a flow chart diagram illustrating one embodiment of a method 400 for supplementing digital text with multimedia effects. In one embodiment, the method 400 is performed by the electronic device 105. In another embodiment, the method 400 may be performed by the multimedia effect apparatus 125. Alternatively, the method 400 may be performed by a computer readable storage medium, such as the memory 115. The computer readable storage medium may store code that is executed on the processor 110 to perform the functions of the method 400.

The method 400 begins and identifies 405 the current reading position. In one embodiment, the reading position module 205 identifies 405 the current reading position. In certain embodiments, identifying 405 the current reading position includes identifying a current reading position based on image data and/or biometric position data. The current reading position may be a chapter, a page, a paragraph, a sentence, and/or a word that the user is currently reading in an e-book or displayed text. In some embodiments, the reading position module 205 stores the current reading position in the memory 115, wherein identifying 405 the current reading position includes retrieving the current reading position from the memory 115.

The method 400 determines 410 a narrative context from the current reading position. In one embodiment, the context module 210 determines 410 the narrative context based on the current reading position. In some embodiments, determining 410 a narrative context includes identifying an idea, action, theme, emotion, setting, or event in the e-book or displayed text. In certain embodiments, determining 410 the narrative context may include identifying a keyword at or near the current reading position.

The method 400 selects 415 a multimedia effect based on the narrative context. In one embodiment, the matching module 215 selects 415 the multimedia effect based on the narrative context. In some embodiments, the multimedia effect is a visual effect, an audio effect, and/or a haptic effect corresponding to the narrative context. For example, the multimedia effect may be one or more of: an image, music, a sound effect, an animation, a color scheme, and an avatar related to the narrative context.

The method 400 presents 420 the multimedia effect. The method 400 ends. In one embodiment, the presentation module 220 presents 420 the multimedia effect. For example, the presentation module 220 may cause an output device 135 to present 420 the multimedia effect.

Figure 4B:
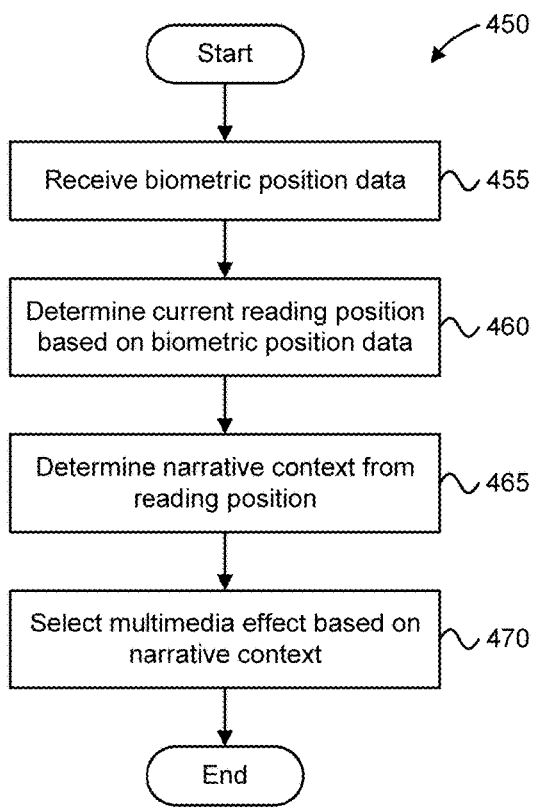
FIG. 4B is a flow chart diagram illustrating another embodiment of a method for supplementing digital text with multimedia effects.

FIG. 4B is a flow chart diagram illustrating one embodiment of a method 450 for supplementing digital text with multimedia effects. In one embodiment, the method 450 is performed by the electronic device 105. In another embodiment, the method 450 may be performed by the multimedia effect apparatus 125. Alternatively, the method 450 may be performed by a computer readable storage medium, such as the memory 115. The computer readable storage medium may store code that is executed on the processor 110 to perform the functions of the method 400.

The method 450 begins and receives 455 biometric position data. In one embodiment, the reading position module 205 receives 455 biometric position data from the biometric module 225. In certain embodiments, the biometric module 225 generates the biometric position data from image data received from the image sensor 140 and/or from inputted data received from the input device 130. In some embodiments, the biometric position data includes one or more of head position data, face position data, ocular position data, and finger position data.

The method 450 identifies 460 the current reading position based on the biometric position data. In one embodiment, the reading position module 205 identifies 460 the current reading position. The current reading position may be a chapter, a page, a paragraph, a sentence, and/or a word that the user is currently reading in an e-book or displayed text. In some embodiments, the reading position module 205 stores the current reading position in the memory 115, wherein identifying 405 the current reading position includes retrieving the current reading position from the memory 115.

The method 450 determines 410 a narrative context from the current reading position. In one embodiment, the context module 210 determines 410 the narrative context based on the current reading position. In some embodiments, determining 410 a narrative context includes identifying an idea, action, theme, emotion, setting, or event in the e-book or displayed text. In certain embodiments, determining 410 the narrative context may include identifying a keyword at or near the current reading position.

The method 450 selects 470 a multimedia effect based on the narrative context. And the method 450 ends. In one embodiment, the matching module 215 selects 470 the multimedia effect based on the narrative context. In some embodiments, the multimedia effect is a visual effect, an audio effect, and/or a haptic effect corresponding to the narrative context. For example, the multimedia effect may be one or more of: an image, music, a sound effect, an animation, a color scheme, and an avatar related to the narrative context.

Figure 5:
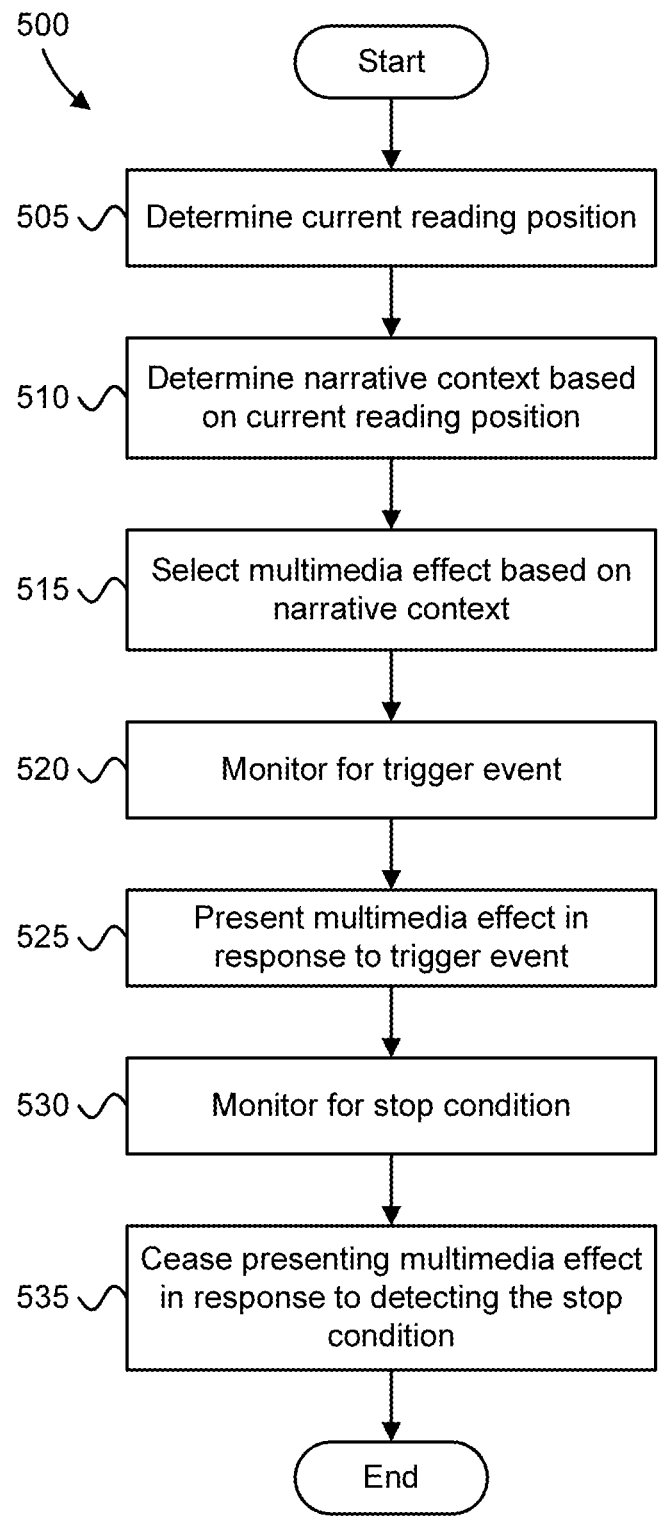
FIG. 5 is a schematic flow chart diagram illustrating one embodiment of a method supplementing digital text with multimedia effects while monitoring for a trigger event and/or a stop condition.

FIG. 5 is a schematic flow chart diagram illustrating one embodiment of a method 500 for supplementing digital text with multimedia effects. In one embodiment, the method 500 is performed by the electronic device 105. In another embodiment, the method 500 may be performed by the multimedia effect apparatus 125. Alternatively, the method 500 may be performed by a computer readable storage medium, such as the memory 115. The computer readable storage medium may store code that is executed on the processor 110 to perform the functions of the method 500.

The method 500 begins and determines 505 a current reading position. In one embodiment, the reading position module 205 identifies 405 the current reading position. In certain embodiments, identifying 405 the current reading position includes identifying a current reading position based on image data and/or biometric position data. The current reading position may be a chapter, a page, a paragraph, a sentence, and/or a word that the user is currently reading in an e-book or displayed text. In some embodiments, the reading position module 205 stores the current reading position in the memory 115, wherein identifying 405 the current reading position includes retrieving the current reading position from the memory 115.

The method 400 determines 410 a narrative context from the current reading position. In one embodiment, the context module 210 determines 410 the narrative context based on the current reading position. In some embodiments, determining 410 a narrative context includes identifying an idea, action, theme, emotion, setting, or event in the e-book or displayed text. In certain embodiments, determining 410 the narrative context may include identifying a keyword at or near the current reading position.

The method 400 selects 415 a multimedia effect based on the narrative context. In one embodiment, the matching module 215 selects 415 the multimedia effect based on the narrative context. In some embodiments, the multimedia effect is a visual effect, an audio effect, and/or a haptic effect corresponding to the narrative context. For example, the multimedia effect may be one or more of: an image, music, a sound effect, an animation, a color scheme, and an avatar related to the narrative context.

The method 500 monitors 520 for a trigger event. In one embodiment, the trigger module 265 monitors 520 for the trigger event. In some embodiments, the trigger event includes a specific point in time, the user reaching a specific reading location, and/or the user selecting a button, icon, or link. The method 500 presents 525 the multimedia effect in response to the trigger event. In one embodiment, the trigger module 265 signals the presentation module 220 to present 525 the multimedia effect in response to the trigger module 265 detecting the trigger event.

The method 500 monitors 530 for a stop condition. In one embodiment, the stop module 270 monitors 530 for the stop condition. The stop condition, in various embodiments, may include a specific point in time, a specific location within the text or e-book, the user switching away from the e-reader application, a mute command, an interruption from another application executing on the electronic device 105, or the like. The method 500 ceases 535 presenting the multimedia effect in response to detecting the stop condition. The method 500 ends. In one embodiment, the stop module 270 signals the presentation module 220 to cease 535 presenting the multimedia effect in response to detecting the stop condition.

Figure 6:
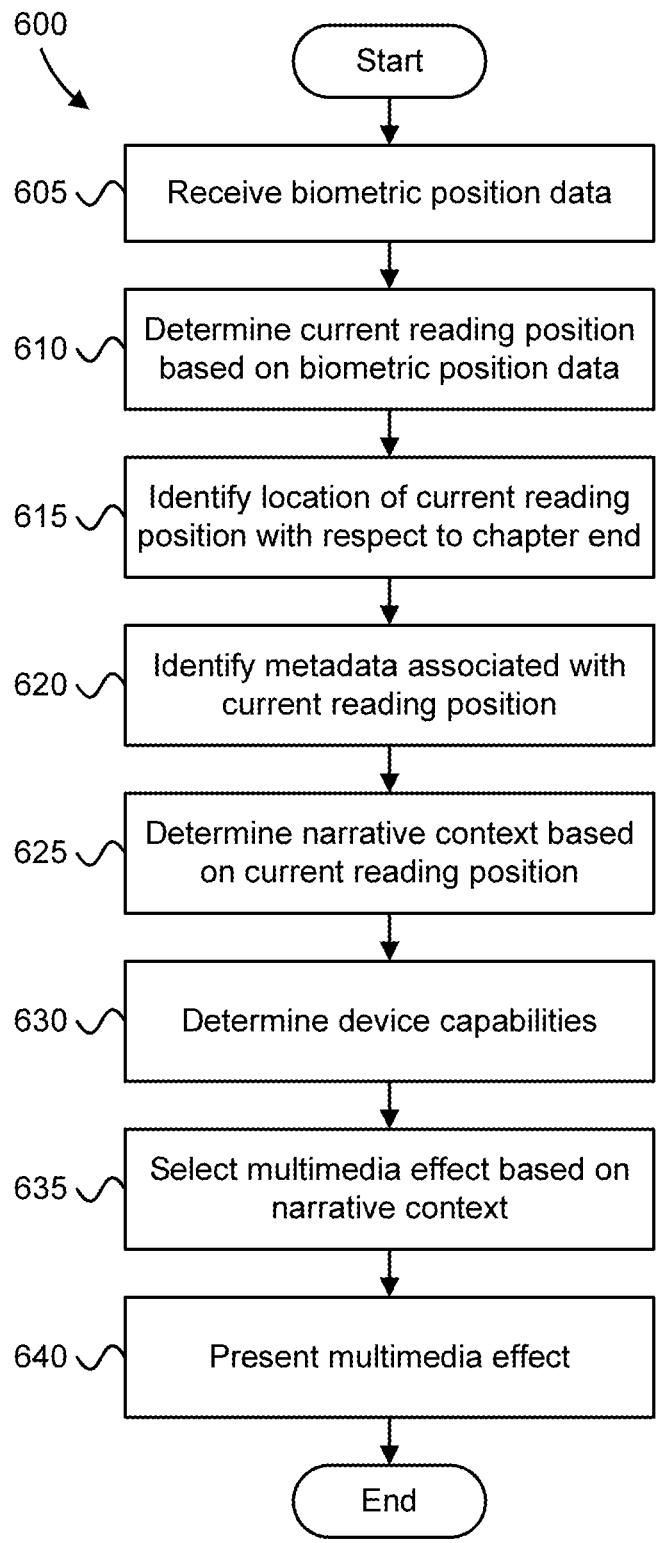
FIG. 6 is a schematic flow chart diagram illustrating another embodiment of a method for supplementing digital text with multimedia effects while selecting the multimedia effect based on a device capability.

FIG. 6 is a schematic flow chart diagram illustrating another embodiment of a method 600 for storing and reproducing stroke data. In one embodiment, the method 600 is performed by the electronic device 105. In another embodiment, the method 600 may be performed by the multimedia effect apparatus 125. Alternatively, the method 600 may be performed by a computer readable storage medium, such as the memory 115. The computer readable storage medium may store code that is executed on the processor 110 to perform the functions of the method 600.

The method 600 begins and receives 605 biometric position data. In one embodiment, the reading position module 205 receives 605 biometric position data from the biometric module 225. The biometric position data may include head position data, face position data, ocular position data, and/or finger position data. The method 600 determines 610 a current reading position based on the biometric position data. In one embodiment, the reading position module 205 determine 610 the current reading position. The current reading position is the location of the user is currently reading in an e-book or displayed text and may be a chapter, a page, a paragraph, a sentence, and/or a word.

In some embodiments, determining 610 the current reading position includes defining the current reading position to a precision and/or granularity based on capabilities of the multimedia effect apparatus 125. For example, where the multimedia effect apparatus 125 has access to a high resolution digital camera (resulting in high precision biometric position data), then the reading position module 205 may determine 610 the current reading position to a high degree of precision (e.g., a small granularity reading position). In another example, where the multimedia effect apparatus 125 only has access to a low-power (or low-speed) processor, small amounts of memory, and/or limited power, then the reading position module 205 may determine 610 the current reading position to a low degree of precision (e.g., a large granularity reading position).

The method 600 identifies 615 a location of the current reading position with respect to a chapter end. In one embodiment, the reading position module 205 identifies 615 the current reading position's location with respect to a chapter end. For example, identifying 615 the current reading position's location with respect to a chapter end may include determining a number of pages, paragraphs, sentences, and/or words until the end of the chapter including the current reading position. As another example, identifying 615 the current reading position's location with respect to a chapter end may include estimating an amount of time until the user reaches the end of the chapter including the current reading position, for example based on a user's reading speed.

The method 600 identifies 620 metadata associated with the current reading position. In one embodiment, the metadata module 240 identifies 620 metadata associated with the current reading position. In some embodiments, the metadata associated with the current reading position includes one or more of tags, illustrations, captions, keywords, notes by an author, notes by a reader, and the like.

The method 600 determines 625 a narrative context based on the current reading position. In one embodiment, the context module 210 determines 625 the narrative context based on the current reading position. In certain embodiments, determining 625 the narrative context based on the current reading position includes determining the narrative context based on the metadata associated with the current reading position. In some embodiments, determining 625 a narrative context includes identifying an idea, action, theme, emotion, setting, or event in the e-book or displayed text. In certain embodiments, determining 625 the narrative context may include identifying a keyword at or near the current reading position.

The method 600 determines 630 one or more device capabilities. In one embodiment, the capability module 255 determines 630 the one or more device capabilities, such as a capability of electronic device 105 for presenting a multimedia effect. Examples of device capabilities include, but are not limited to, the electronic device 105 being capable of playing audible sounds, providing haptic feedback, presenting background images, presenting animations, presenting hyperlinks, and the like. In some embodiments, the determining 630 the one or more device capabilities include determining an ability of the electronic device 105 to present a multimedia effect at a particular time. For example, the device capability may indicate whether the electronic device 105 is capable accurately identify a time at which the user reads a specific word.

The method 600 selects 635 one or more multimedia effects based on the narrative context. In one embodiment, the matching module 215 selects 635 the one or more multimedia effects based on the narrative context. In some embodiments, selecting 635 the one or more multimedia effects further comprises selecting a multimedia effect based on the location of the current reading position with respect to the chapter end and/or on the one or more device capabilities. For example, selecting 635 the one or more multimedia effects may include selecting a multimedia effect with a shorter duration in response to the current reading position being near the end of the chapter. As another example, selecting 635 the one or more multimedia effects may include selecting a multimedia effect that the device is capable of playing, based on the device capabilities.

The method 600 presents 640 the one or more multimedia effects. The method 600 ends. In one embodiment, the presentation module 220 presents 640 the multimedia effect. For example, the presentation module 220 may cause an output device 135 to present 640 the multimedia effect. In one embodiment, presenting 640 the multimedia effect(s) includes presenting a multimedia effect in response to detecting a triggering event. In another embodiment, presenting 640 the multimedia effect(s) includes ceasing presentation of a multimedia effect in response to detecting a stop condition.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an image sensor that captures image data of text on a remote object being read by a user, the remote object being one of: print media and an electronic reader separate from the apparatus;
   a processor; and
   a memory that stores code executable by the processor to:

determine whether external multimedia equipment is coupled to the apparatus;
determine a genre of the text;
identify one or more allowable types of multimedia effects based on the genre and whether external multimedia equipment is coupled to the apparatus, wherein the one or more allowable types of multimedia effects is further based on a type of external multimedia equipment coupled to the apparatus in response to external multimedia equipment being coupled to the apparatus;
determine a current reading position of the user, wherein the text is not presented by the apparatus;
determine a narrative context based on the current reading position, wherein the narrative context is one of an action described in the text, an event described in the text, a setting described in the text, and a location described in the text;
select a multimedia effect from the one or more allowable types of multimedia effects based on the narrative context; and
present the selected multimedia effect to a user, the selected multimedia effect being at least one of: a background image, an animation, a color scheme, a sound effect corresponding to an action or event described in the text, and an avatar representative of a character associated with the narrative context.

2. The apparatus of claim 1, further comprising a network interface that communicates with a remote database, wherein selecting a multimedia effect based on the narrative context comprises querying the remote database for a multimedia effect corresponding to the narrative context.

3. The apparatus of claim 1, wherein the processor further identifies a device capability, wherein selecting a multimedia effect based on the narrative context comprises selecting a multimedia effect based on the device capability.

4. The apparatus of claim 1, wherein the processor further identifies an illustration in a presented e-book near the current reading position, wherein identifying the narrative context at the current reading position comprises associating the illustration in the presented e-book with at least one keyword and wherein selecting a multimedia effect based on the narrative context comprises selecting a multimedia effect corresponding to the at least one keyword.

5. A method comprising:
capturing, by use of an image sensor of a wearable electronic device, image data of text on a remote object being read by a user, the remote object being one of an electronic reader separate from the wearable electronic device and print media;
determining whether external multimedia equipment is coupled to the apparatus;
determining a genre of the text;
identifying one or more allowable types of multimedia effects based on the genre and whether external multimedia equipment is coupled to the apparatus, wherein the one or more allowable types of multimedia effects is further based on a type of external multimedia equipment coupled to the apparatus in response to external multimedia equipment being coupled to the apparatus;
determining a current reading position of the user, wherein the text is not presented by the apparatus;
determining a narrative context from the current reading position, wherein the narrative context is one of an action described in the text, an event described in the text, a setting described in the text, and a location described in the text;
selecting a multimedia effect from the one or more allowable types of multimedia effects based on the narrative context; and
presenting the selected multimedia effect, the selected multimedia effect being at least one of: a background image, an animation, a color scheme, a sound effect corresponding to an action or event described in the text, and an avatar representative of a character associated with the narrative context.

6. The method of claim 5, wherein determining a current reading position of the user comprises:
receiving biometric position data;
determining a reading speed based on the biometric position data;
determining an elapsed time from the user reaching a reference position in the text; and
determining the current reading position based on the reading speed and on the elapsed time.

7. The method of claim 5, further comprising identifying a location of the current reading position with respect to a chapter end, wherein selecting the multimedia effect is further based on the location of the current reading position with respect to a chapter end.

8. The method of claim 5, wherein determining a narrative context from the current reading position comprises identifying one of: a theme and an emotion associated with the current reading position.

9. The method of claim 5, wherein presenting the multimedia effect comprises:
monitoring for a triggering event; and
presenting the multimedia effect in response to detecting the triggering event, wherein the triggering event is one of: the user selecting an icon, the user selecting a link, the user selecting a button, the user reaching a specific location within the text, and the user reaching a last word in a sentence that includes the current reading position.

10. The method of claim 5, wherein presenting the multimedia effect comprises:
monitoring for a stop condition; and
ceasing to present the multimedia effect in response to detecting the stop condition.

11. The method of claim 5, wherein presenting the multimedia effect comprises:
displaying a notification near the current reading position; and
presenting the multimedia effect in response to a user selecting the notification.

12. The method of claim 5, wherein determining a narrative context of the current reading position comprises performing natural language analysis on text at the current reading position.

13. A program product comprising a computer readable storage medium that is not a transitory signal and that stores code executable by a processor, the executable code comprising code to perform:
capturing, by use of an image sensor of a wearable electronic device, image data of text on a remote object being read by a user, the remote object being one of an electronic display not coupled to the wearable electronic device and a print medium;
determining whether external multimedia equipment is coupled to the apparatus;
determining a genre of the text;

identifying one or more allowable formats of multimedia effects based on the genre and whether external multimedia equipment is coupled to the apparatus, wherein the one or more allowable formats of multimedia effects is further based on a type of external multimedia equipment coupled to the apparatus in response to external multimedia equipment being coupled to the apparatus;

determining a current reading position of the user, wherein the text is not presented by the apparatus;

determining a narrative context of the current reading position, wherein the narrative context is one of an action described in the text, an event described in the text, a setting described in the text, and a location described in the text;

selecting a multimedia effect from the one or more allowable formats of multimedia effects based on the narrative context; and presenting the selected multimedia effect, the selected multimedia effect being at least one of: a background image, an animation, a color scheme, a sound effect corresponding to an action or event described in the text, and an avatar representative of a character associated with the narrative context.

14. The program product of claim 13, the code to further perform:

identifying a user multimedia preference, wherein identifying one or more allowable formats of multimedia effects comprises selecting a multimedia format based on the user multimedia preference.

15. The program product of claim 13, the code to further perform:

determining a reading speed; and determining a presentation time based on the reading speed and on the current reading position, the current reading position being selected from the group consisting of: a current chapter, a page, and a paragraph, wherein presenting the multimedia effect comprises presenting the multimedia effect at the presentation time.

16. The program product of claim 13, wherein presenting the selected multimedia effect comprises presenting the selected multimedia effect in response to a triggering event.

* * * * *